(12) United States Patent
Menezo et al.

(10) Patent No.: US 10,884,187 B2
(45) Date of Patent: Jan. 5, 2021

(54) METHOD FOR THE COLLECTIVE PRODUCTION OF A PLURALITY OF OPTOELECTRONIC CHIPS

(71) Applicant: COMMISSARIAT A L'ENERGIE ATOMIQUE ET AUX ENERGIES ALTERNATIVES, Paris (FR)

(72) Inventors: Sylvie Menezo, Voiron (FR); Frank Fournel, Villard-Bonnot (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/349,173

(22) PCT Filed: Nov. 10, 2017

(86) PCT No.: PCT/FR2017/053067
§ 371 (c)(1),
(2) Date: May 10, 2019

(87) PCT Pub. No.: WO2018/087485
PCT Pub. Date: May 17, 2018

(65) Prior Publication Data
US 2019/0265413 A1 Aug. 29, 2019

(30) Foreign Application Priority Data
Nov. 14, 2016 (FR) ...................... 16 60967

(51) Int. Cl.
*G02B 6/136* (2006.01)
*G02B 6/12* (2006.01)
*G02B 6/42* (2006.01)

(52) U.S. Cl.
CPC ......... *G02B 6/136* (2013.01); *G02B 6/12004* (2013.01); *G02B 6/4245* (2013.01);
(Continued)

(58) Field of Classification Search
None
See application file for complete search history.

(56) References Cited

U.S. PATENT DOCUMENTS

| 6,096,155 A | 8/2000 | Harden et al. |
| 6,406,583 B1 | 6/2002 | Harden et al. |

(Continued)

FOREIGN PATENT DOCUMENTS

| EP | 1 151 962 A1 | 11/2001 |
| EP | 1 621 906 A1 | 2/2006 |

(Continued)

OTHER PUBLICATIONS

International Search Report dated Feb. 27, 2018 in PCT/FR2017/053067 filed Nov. 10, 2017.

*Primary Examiner* — Daniel Whalen
(74) *Attorney, Agent, or Firm* — Oblon, McClelland, Maier & Neustadt, L.L.P.

(57) ABSTRACT

A method is provided for producing, on a wafer-scale, a plurality of optoelectronic chips, including: providing a receiver substrate including a plurality of elementary zones, each being configured to contain one optoelectronic chip, and each including at least one coupling waveguide integrated into the receiver substrate and configured to be optically coupled to a first optoelectronic component; transferring a plurality of pads to the elementary zones such that the pads partially cover the at least one coupling waveguide; and producing the first optoelectronic component from the pads such that each first optoelectronic component is facing the at least one coupling waveguide of a corresponding elementary zone, and, following the transferring step, each pad of the plurality of pads extends over a set of at least two adjacent elementary zones, so as to partially cover the at least one coupling waveguide of each of the adjacent elementary zones.

15 Claims, 6 Drawing Sheets

(52) U.S. Cl.
   CPC .......... *G02B 2006/121* (2013.01); *G02B 2006/12061* (2013.01); *G02B 2006/12078* (2013.01); *G02B 2006/12107* (2013.01); *G02B 2006/12121* (2013.01); *G02B 2006/12123* (2013.01)

(56) References Cited

U.S. PATENT DOCUMENTS

| | | |
|---|---|---|
| 6,406,636 B1 | 6/2002 | Vaganov |
| 6,610,166 B1 | 8/2003 | Harden et al. |
| 2001/0038148 A1 | 11/2001 | Mastromatteo et al. |
| 2002/0135062 A1 | 9/2002 | Mastromatteo et al. |
| 2003/0011889 A1 | 1/2003 | Harden et al. |
| 2004/0040648 A1 | 3/2004 | Harden et al. |
| 2004/0252931 A1 | 12/2004 | Belleville et al. |
| 2005/0236700 A1 | 10/2005 | Ghyselen et al. |
| 2006/0291771 A1* | 12/2006 | Braunisch ............ G02B 6/4224 385/15 |
| 2008/0085089 A1 | 4/2008 | Catching et al. |
| 2013/0083397 A1 | 4/2013 | Harden et al. |
| 2017/0207600 A1 | 7/2017 | Klamkin et al. |

FOREIGN PATENT DOCUMENTS

| | | |
|---|---|---|
| EP | 1 873 583 A2 | 1/2008 |
| WO | WO 99/18612 A2 | 4/1999 |
| WO | WO 00/73090 A1 | 12/2000 |
| WO | WO 03/042741 A2 | 5/2003 |
| WO | WO 2016/011002 A1 | 1/2016 |

\* cited by examiner

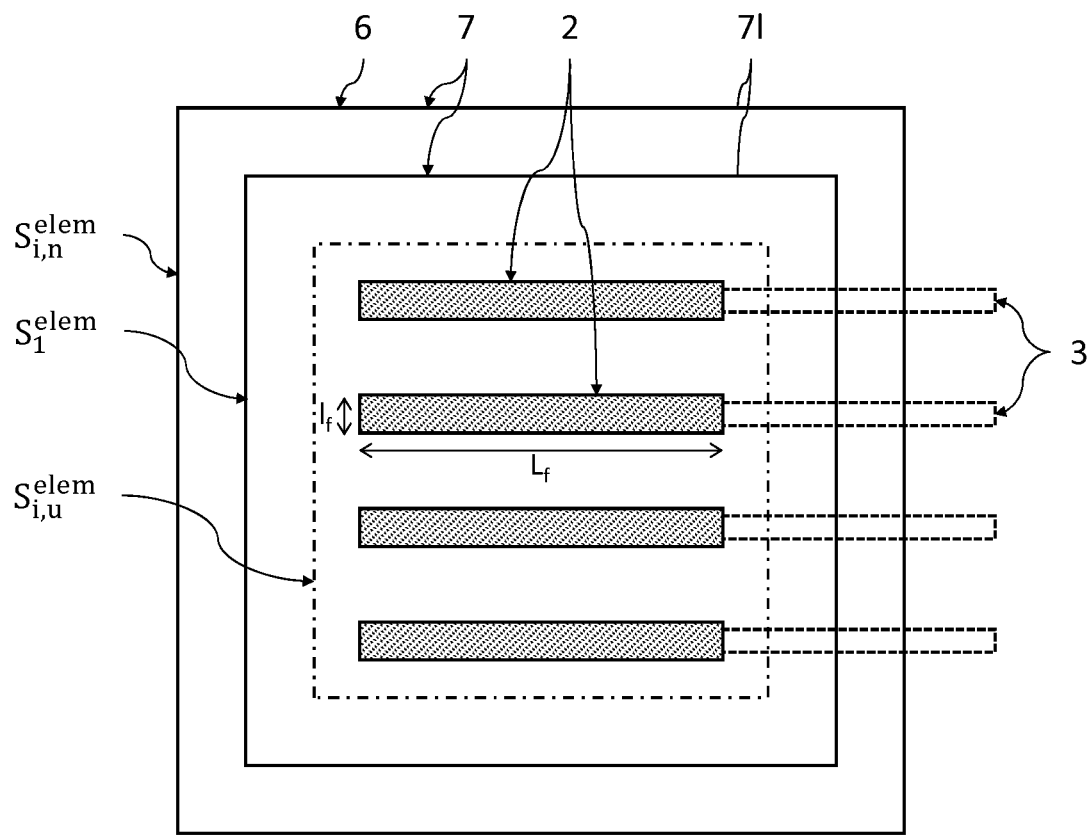
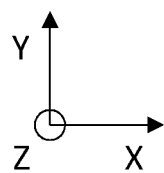
Fig.3 (PRIOR ART)

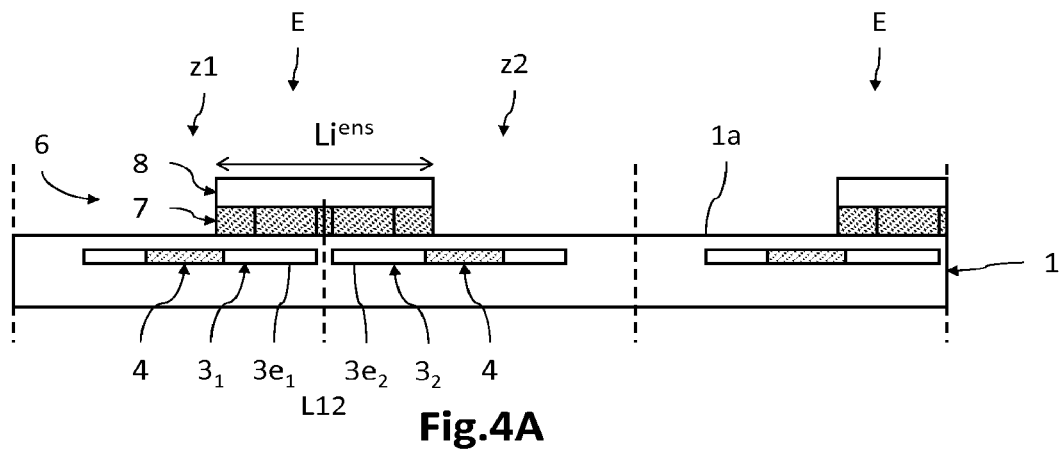
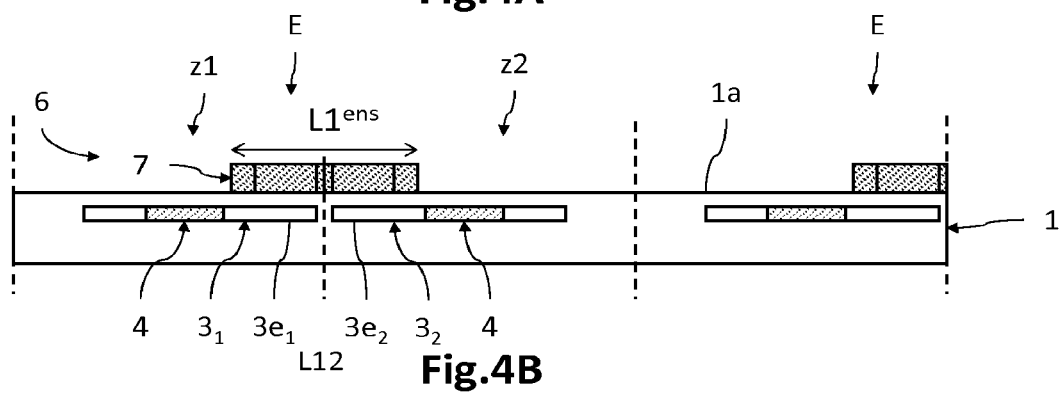
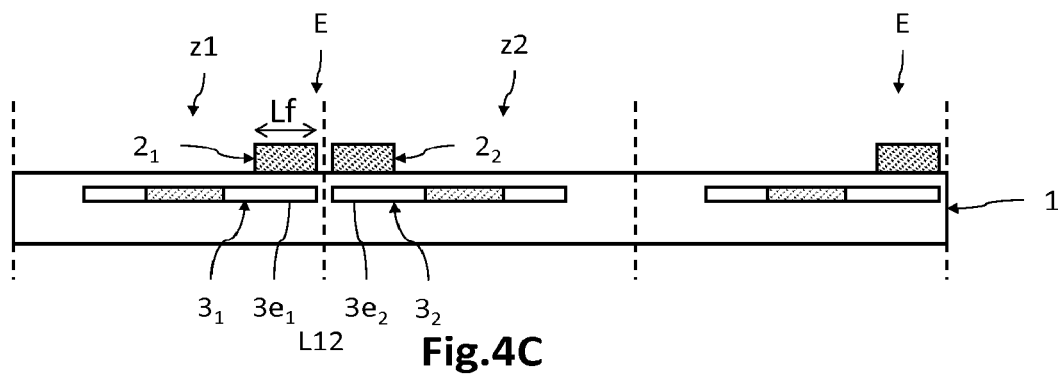
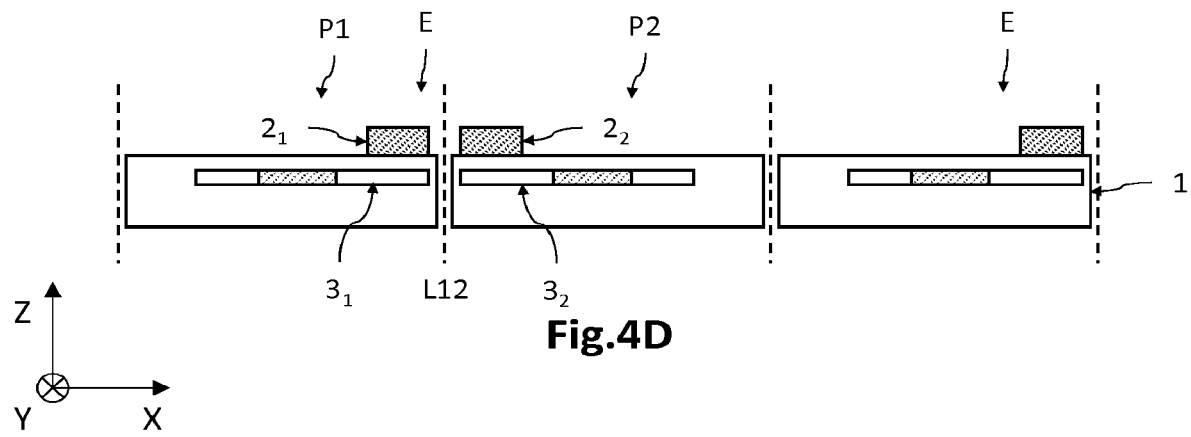

METHOD FOR THE COLLECTIVE PRODUCTION OF A PLURALITY OF OPTOELECTRONIC CHIPS

TECHNICAL FIELD

The field of the invention is that of processes for producing, on the wafer-scale, a plurality of optoelectronic chips, using a technique for transferring dies to a functionalized receiver substrate.

PRIOR ART

Optoelectronic chips comprising diodes able to emit or detect electromagnetic radiation may be produced, on the wafer-scale, using a technique for transferring pads based on a semiconductor compound, which pads are also referred to as dies, to a receiver substrate.

FIG. 1A schematically illustrates, as seen from above, an example of optoelectronic chips P produced on an SOI receiver substrate 1. The dashed lines represent the dicing lines L of a subsequent singulation of the optoelectronic chips P by dicing of the receiver substrate 1. The dicing lines L thus bound elementary zones z of the receiver substrate 1, in which zones the optoelectronic chips P are produced. Each elementary zone z here comprises active (diodes, modulators, etc.) and passive (waveguides, multiplexers, etc.) photonic components that are optically coupled to one another so as to form a photonic circuit.

FIG. 1B illustrates in detail four adjacent optoelectronic chips P1, P2, P3, P4 as shown in FIG. 1A. The optoelectronic chips P1, P2, P3, P4 are here transmitters each comprising an array of a plurality of laser diodes 2 based on a semiconductor compound, for example InP, and taking the form of a stack of semiconductor layers that here mainly comprise InP, each laser diode being optically coupled to a so-called coupling waveguide (here represented by an arrow starting 30 from the laser diode 2) that is integrated into the receiver substrate 1, and that allows the optical mode emitted by the laser diode 2 to propagate to a modulator 4 then to a multiplexer 5. Of course, the integrated photonic circuits may be different from those shown in this figure, and may notably comprise other photonic components, for example couplers to optical fibers. The optoelectronic chips may also be photodiode-based receivers, or transceivers comprising both laser diodes and photodiodes.

A process for producing optoelectronic chips on the wafer-scale may comprise a step of transferring a plurality of pads to the receiver substrate in the various elementary zones. Each pad comprises a semiconductor segment based on a semiconductor compound, for example a III-V die, and it is then referred to as a III-V die. The semiconductor segment may thus be made up of a stack of a plurality of semiconductor layers. The transfer is carried out so that the III-V dies are deposited in separate elementary zones, so that each III-V die covers a so-called coupling portion of at least one coupling waveguide of the corresponding zone. The III-V dies may notably be bonded to the receiver substrate by direct bonding. A step of structuring the III-V dies is then carried out in order to produce, by lithography and etching, a plurality of optoelectronic components, such as laser diodes, photodiodes or even electroabsorption modulators, each optoelectronic component lying facing the coupling portion of a waveguide, and therefore being optically coupled to the latter. The optoelectronic chips are then singulated by dicing the receiver substrate.

Patent application WO2016/011002 describes the production of integrated photonic circuits via flip-chip transfer of a semiconductor die to a functionalized silicon-based substrate.

There is however a need to decrease the cost of fabrication of optoelectronic chips without however complexifying the production process.

SUMMARY OF THE INVENTION

The objective of the invention is to at least partially remedy the drawbacks of the prior art, and more particularly to provide a process for producing optoelectronic chips on the wafer-scale that allows fabrication costs to be decreased. To this end, the subject of the invention is a process for producing, on the wafer-scale, a plurality of optoelectronic chips, comprising the following steps:

providing a receiver substrate comprising a plurality of so-called elementary zones that are each intended to contain one optoelectronic chip, each elementary zone comprising at least one so-called coupling waveguide that is integrated into the receiver substrate and that is intended to be optically coupled to a first optoelectronic component;

transferring a plurality of pads to the elementary zones so that the pads partially cover the coupling waveguides;

producing said first optoelectronic components from said pads, so that each first optoelectronic component is facing at least one coupling waveguide of the corresponding elementary zone.

According to the invention, following the transferring step, each pad extends over a set of at least two adjacent elementary zones, so as to partially cover at least one coupling waveguide of each of said adjacent elementary zones.

The following are certain preferred but nonlimiting aspects of this process.

Thus, in the step of producing the first optoelectronic components, each of the first optoelectronic components produced from a given pad may be located facing one of the coupling waveguides of the adjacent elementary zones of said given set.

At least one first optoelectronic component of a first elementary zone and at least one second optoelectronic component of a second elementary zone adjacent to the first elementary zone and belonging to said given set, said first and second optoelectronic components being produced from the same pad, may be respectively spaced apart by an equal distance from a separation line forming a common border to said first and second adjacent elementary zones. Said distance may be smaller than 600 μm.

Said first optoelectronic component and said second optoelectronic component may be spaced apart from each other by a distance smaller than 1.2 μm.

A first optoelectronic component may be located facing a coupling portion of a first coupling waveguide of a first elementary zone of a set, and a second optoelectronic component may be located facing a coupling portion of a second coupling waveguide of a second elementary zone adjacent to the first elementary zone and belonging to said given set, the first and second coupling waveguides extending, from their respective coupling portions, parallelly.

Said first and second coupling waveguides may extend, from their respective coupling portions, in opposite directions to each other.

Said first and second coupling waveguides may extend, from their respective coupling portions, in directions that are parallel to each other.

The first coupling waveguide and the second coupling waveguide may extend, from their respective coupling portions, so as to have, with respect to each other, an axial symmetry about said separation line.

Each pad may extend over a set of four pairwise adjacent elementary zones.

Each pad may comprise a semiconductor segment based on a semiconductor compound, and a growth substrate from which the semiconductor segment is produced by epitaxy.

The process may comprise a step of removing the growth substrate, the latter being made from an alloy based on said semiconductor compound.

Each pad may comprise a semiconductor segment based on a III-V semiconductor compound.

The first optoelectronic component may be a laser source, a photodiode or an electro-optical modulator.

Each elementary zone of said set may comprise an array of a plurality of coupling waveguides, and an array of a plurality of first optoelectronic components may be produced for each of the elementary zones of said set, so that the first optoelectronic components of a given array are respectively facing corresponding coupling waveguides.

The process may comprise a step of transferring a plurality of first pads from which a plurality of laser diodes are produced and a step of transferring a plurality of second pads from which a plurality of photodiodes or a plurality of electro-optical modulators are produced.

The process may comprise a subsequent step of dicing the receiver substrate along dicing lines passing between the elementary zones, so as to obtain a plurality of separate optoelectronic chips.

BRIEF DESCRIPTION OF THE DRAWINGS

Other aspects, aims, advantages and features of the invention will become clearer on reading the following detailed description of preferred embodiments thereof, which description is given by way of nonlimiting example with reference to the appended drawings, in which:

FIG. 3 partially and schematically illustrates, as seen from above, the area of a die in the course of various steps of the conventional process described above allowing, in one elementary zone, an array of four laser diodes coupled to coupling waveguides to be produced;

FIGS. 4A to 4D partially and schematically illustrate, in cross section along the line B-B in FIG. 5A, various steps of a process for producing optoelectronic chips on the wafer-scale according to one embodiment of the invention;

DETAILED DESCRIPTION OF PARTICULAR EMBODIMENTS

Figure 1A:
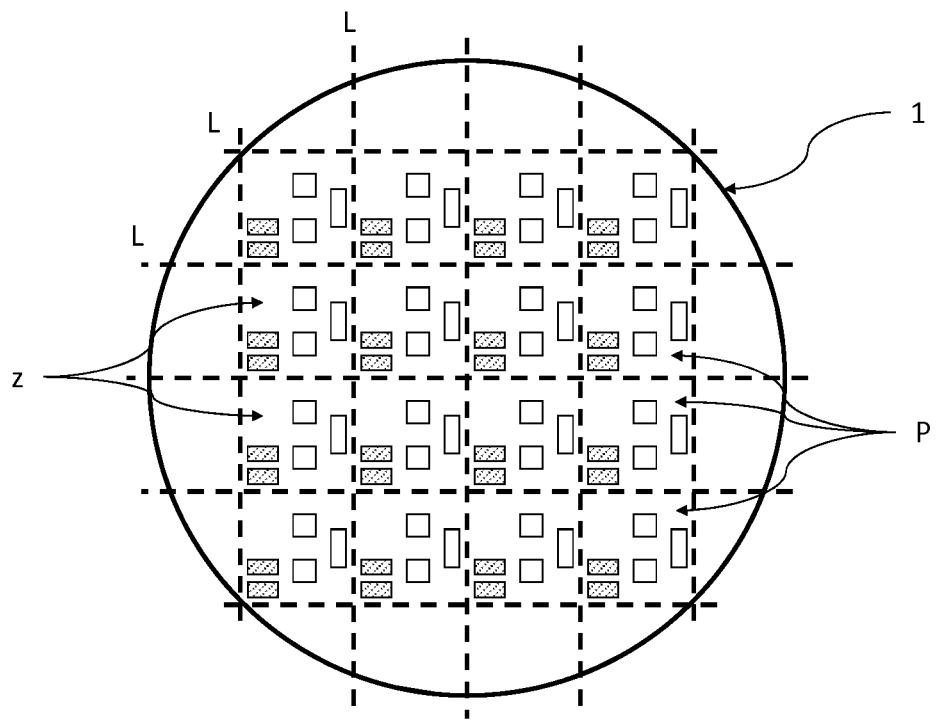
FIG. 1A, which has already been described with reference to the prior art, schematically illustrates, as seen from above, an example of optoelectronic chips formed on a receiving substrate.

In the figures and in the rest of the description, the same references have been used to refer to elements that are identical or similar. In addition, the various elements are not shown to scale for the sake of clarity of the figures. Moreover, the various embodiments and variants are not exclusive from one another and may be combined together. Unless otherwise indicated, the terms "substantially", "about" and "of the order of" mean to within 10%.

The invention relates to producing optoelectronic chips on the wafer-scale, using a technique for transferring pads, also referred to as dies, to a functionalized receiver substrate.

By optoelectronic chip, what is meant is a device comprising at least one first optoelectronic component able to emit, detect, or even modulate electromagnetic radiation, said component being based on a given semiconductor compound and resting on the receiver substrate. The first optoelectronic component is said to be based on the given semiconductor compound in the sense that it mainly comprises said semiconductor compound. It may comprise a stack of thin layers made from various alloys consisting of or comprising said semiconductor compound. Each chip furthermore comprises passive and/or active photonic components. Each first optoelectronic component is optically coupled to a so-called coupling waveguide, which is integrated into the receiver substrate and which forms at least one portion of a photonic circuit. The optoelectronic chips are produced in so-called elementary zones of a receiver substrate, the elementary zones forming separate areas of the substrate. The photonic circuit of an optoelectronic chip may be made from an elementary pattern that is identical or similar in each of the optoelectronic chips. The elementary pattern may thus be defined in a mask used in photolithography steps.

The pads, or dies, each comprise a semiconductor segment produced by epitaxial growth from a growth substrate. The semiconductor segment is based on the aforementioned semiconductor compound, and is intended to allow one or more first optoelectronic components to be produced. The pads may have an area, in the plane parallel to the plane of the receiver substrate, of the order of a few square millimeters, and a thickness of the order of a few tens of microns to a few hundred microns. The semiconductor compound is preferably a III-V compound, i.e. it is an alloy comprising at least one element from column III and at least one element from column V of the periodic table. The semiconductor compound may be, for example, InP or GaAs. The dies are then said to be III-V dies.

The semiconductor segment may be a heterostructure comprising a stack of an n-doped first layer and of a p-doped second layer, these layers being arranged with respect to each other so as to form a p-n or p-i-n junction, at least one intermediate layer forming a quantum well, optionally between barrier layers, possibly being located between said layers. The one or more quantum wells and the barrier layers are intrinsic, i.e. unintentionally doped, and are based on the semiconductor compound. By way of example, the heterostructure may be an InGaAsP/InP, InAlGaAs/InP or AlInGaAs/GaAs heterostructure, inter alia. Thus, in the case where the semiconductor compound is InP, the doped layers may be made of InP, the quantum wells made of InAsP and the barrier layers made of InGaAsP.

The receiver substrate is said to be functionalized in the sense that it comprises at least one passive transmitting optical component, namely a coupling waveguide, integrated into the substrate, i.e. produced at or under the front side of the receiver substrate. It may also comprise other passive optical components (multiplexers or demultiplexers, couplers to optical fibers, etc.) and/or active optical components (modulators, etc.), that are optically coupled to one another so as to form a so-called integrated photonic circuit. The receiver substrate may be an SOI substrate, i.e. it may comprise a thin surface layer of silicon and a bulk silicon layer, between which is inserted a so-called buried oxide (BOX) i.e. a layer of silicon oxide. The thin surface layer may be covered with a layer allowing the die to be bonded to the front side of the receiver substrate, for example an oxide layer in the case of direct bonding.

Generally, the optoelectronic chips may be transmitters Tx including an array of laser diodes coupled to coupling waveguides, and, for example, modulators, at least one multiplexer and a coupler to an optical fiber. They may also be receivers Rx comprising photodiodes, a demultiplexer and a coupler; or even transceivers comprising both laser diodes and photodiodes. In the context of the invention, the optoelectronic chips are, purely by way of illustration, transmitters Tx comprising laser diodes based on a III-V semiconductor compound, which are optically coupled to coupling waveguides of a photonic circuit, the latter being integrated into a silicon-based receiver substrate, an SOI substrate for example.

Figure 1B:
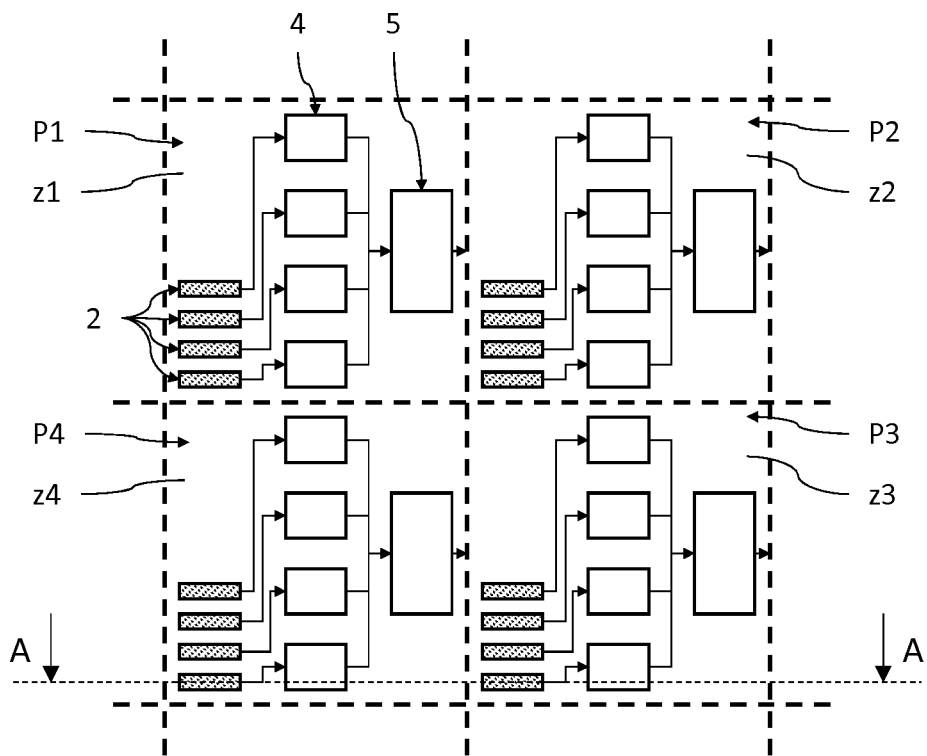
FIG. 1B, which has already been described, is a detailed view of four adjacent optoelectronic chips as illustrated in FIG. 1A.

FIGS. 2A to 2D are partial and schematic cross-sectional views along the axis A-A illustrated in FIG. 1B of the various steps of an example of a conventional process for producing optoelectronic chips by transferring dies to a receiver substrate, and more particularly for producing first optoelectronic components, here laser diodes, that are optically coupled to an integrated photonic circuit. In this example, the dies are based on a III-V semiconductor compound and the receiver substrate is an SOI substrate. Only certain steps of the production process are illustrated and described here.

Here, and for the rest of the description, a three-dimensional direct orthogonal coordinate system (X, Y, Z) is defined in which the X- and Y-axes form a plane parallel to the plane of the front side of the receiver substrate, and in which the Z-axis is oriented substantially orthogonally to the plane of the receiver substrate.

In this example, the III-V dies are pads that are separate from one another comprising a semiconductor segment based on a III-V semiconductor compound, InP or GaAs for example, and which is here formed from a stack of thin layers in which the III-V semiconductor compound is predominant. They furthermore comprise the growth substrate from which the respective semiconductor segments are produced. Said growth substrate is made from a material having a good lattice-parameter match with that of the III-V semiconductor compound. It may be made from the same III-V semiconductor compound, InP for example, or even from an alloy comprising the same III and V elements as the III-V semiconductor compound. By way of illustration, the growth substrate may be made of InP when the dies are of InGaAsP/InP. The receiver substrate is silicon-based, and may be an SOI substrate. It comprises photonic components that are said to be integrated in the sense that they are located in the interior of the same receiver substrate, and are here coupling waveguides, modulators made of silicon, and a wavelength multiplexer made of silicon. The coupling waveguides form an optical path between the diodes and the modulators.

Figure 2A:
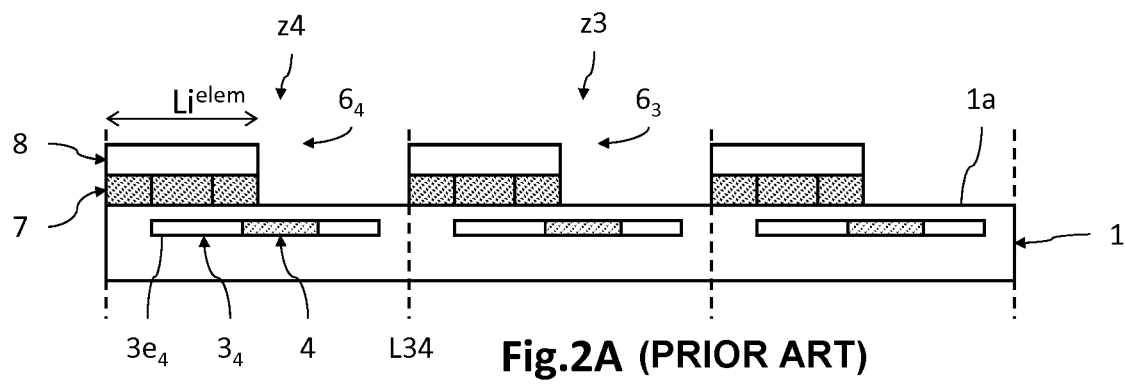
FIGS. 2A to 2D partially and schematically illustrate, in cross section along the line A-A in FIG. 1B, various steps of a conventional process for producing optoelectronic chips on the wafer-scale.

FIG. 2A illustrates a step of transferring a plurality of dies 6 to the receiver substrate 1. Each die 6 comprises a semiconductor segment 7 and a growth substrate 8. The addition is carried out so that the free face of each semiconductor segment 7, i.e. the face opposite the growth substrate 8, makes contact with the front side 1a of the receiver substrate 1. The dies 6 are here fastened to the receiver substrate 1 by direct bonding, by means of an oxide layer (not shown) located at the interface between the die 6 and the receiver substrate 1, for example a layer of silicon oxide of a few nanometers to a few tens of nanometers thickness.

The dies 6 are each positioned in one elementary zone z of the receiver substrate 1, here in an amount of one die 6 per elementary zone z, although, as a variant, a plurality of separate transfers could be deposited in the same elementary zone. Here, dies $6_3$ and $6_4$ are positioned in the elementary zones z3 and z4, respectively. The elementary zones z are located between the dashed lines, and are intended to contain the area of the optoelectronic chips P, here notably P3 and P4 (FIG. 2D), which will be singulated in a subsequent step of dicing the receiver substrate 1.

In each elementary zone z is located at least one photonic circuit comprising photonic components out of which only a coupling waveguide 3 and a modulator 4 are shown here. The photonic circuit is here said to be integrated in so far as it comprises a plurality of photonic components (a guide 3, a modulator 4, etc.) fabricated in the same receiver substrate 1 and located in the interior of the latter. Here, in the case of the elementary zone z4, the photonic circuit comprises an array of coupling waveguides $3_4$, each coupling waveguide $3_4$ comprising a first so-called coupling portion $3e_4$ that allows the optical coupling between the laser diodes $2_4$ and the waveguides $3_4$.

Each die $6_3$, $6_4$ is positioned, in a different elementary zone z3, z4, so as to partially cover the coupling waveguides $3_3$, $3_4$ of the corresponding photonic circuit, level with the respective coupling portions $3e_3$, $3e_4$.

The transferred dies 6 have an initial area $S_{i,n}^{elem}$, in the XY-plane, for example equal to $Li^{elem} \times Li^{elem}$ in the case of a square profile. The initial area $S_{i,n}^{elem}$, depends on the number of diodes 2 to be produced facing the coupling waveguides 3, and may be of the order of a few square millimeters. Of course, the dies 6 may have other types of profile in the XY-plane, for example a profile that is rectangular, polygonal, circular, etc.

Figure 2B:
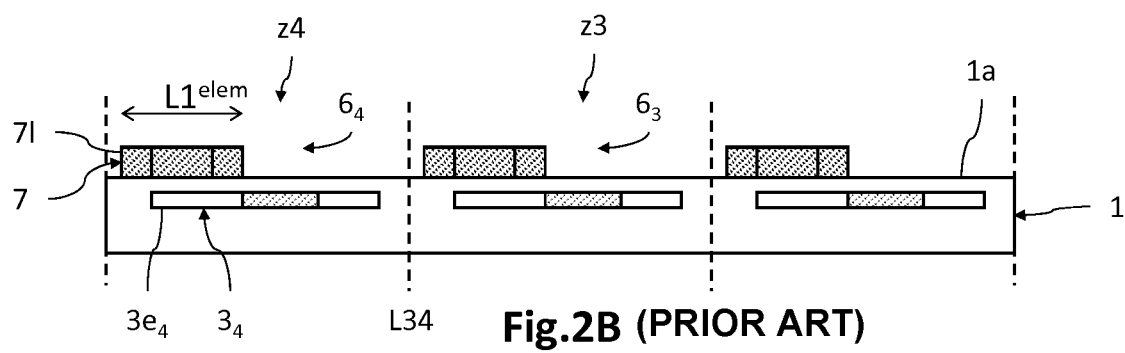

FIG. 2B illustrates a preferable step of removing the growth substrate 8. The removal may be carried out by chemical etching, optionally preceded by mechanical thinning. The thickness of the dies 6 then corresponds substantially to the thickness of the semiconductor segments 7.

Lateral over-etching of the semiconductor segments 7, in the XY-plane, is liable to occur during the removal of the growth substrate, notably when the material of the growth substrate 8 is an alloy comprising at least the same III and V elements as those of the III-V semiconductor compound on which the semiconductor segments 7 are based. This is for example the case when a growth substrate 8 made of InP is used for the growth of a semiconductor segment 7 based on InP, an InGaAsP/InP segment for example, and when the growth substrate 8 is removed by chemical etching in hydrochloric acid.

The semiconductor segment 7 of the dies 6 then has an area $S_1^{elem}$ in the XY-plane, for example of $L1^{elem} \times L1^{elem}$ in the case of a square profile, smaller than the initial area $S_i$. By way of example, the semiconductor segment 7 may be etched from its lateral edge 7l over a distance of about 300 μm, this meaning that: $L1^{elem} = Li^{elem} \times 2 \times 300$ μm.

Figure 2C:
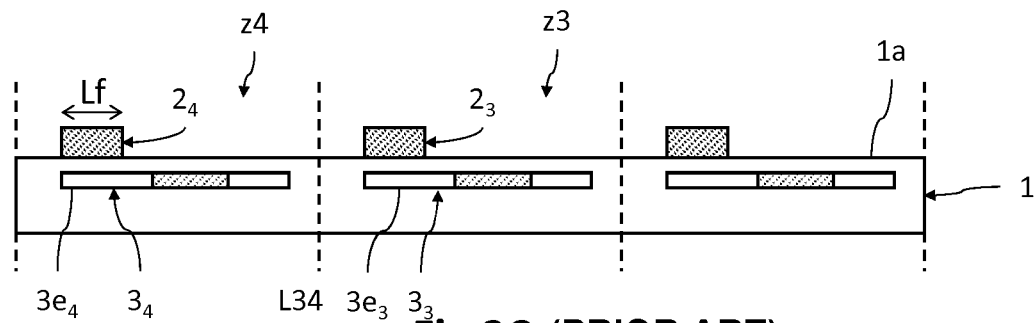

FIG. 2C illustrates a subsequent step of producing, here, an array of four laser diodes 2 from each semiconductor segment 7. The laser diodes 2 are here ridge diodes, which have a length Lf along the longitudinal axis X larger than a width lf along the transverse axis Y, but other diodes are possible, such as for example vertical-cavity surface-emitting lasers (VCSELs). Such a ridge laser diode 2 comprises a waveguide located in the semiconductor segment 7, which forms the semiconductor optical amplifier (SOA), and is arranged facing along the Z-axis a coupling waveguide 3 in order to allow the optical coupling between the two guides. Such a ridge laser diode is notably described in document EP2811593. The laser diodes 2 are produced using conventional steps of lithography and etching, so that each laser diode $2_3$, $2_4$ is located facing, along the Z-axis, a coupling portion $3e_3$, $3e_4$ of a coupling waveguide $3_3$, $3_4$ so that the diode 2 is optically coupled to the corresponding coupling waveguide 3. Metal contacts (not shown) are also produced so as to be able to inject a pumping current into the various diodes 2.

Figure 2D:
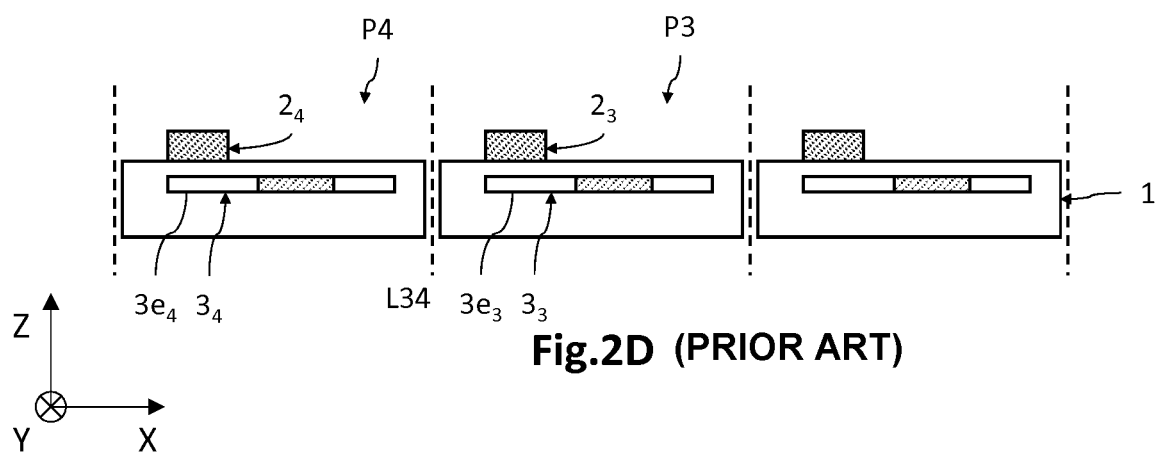

FIG. 2D illustrates the step of dicing the receiver substrate 1 along the dicing lines L, so as to obtain a plurality of separate optoelectronic chips P. In this example, the chips P3 and P4 are obtained by dicing notably along the line L34. The optoelectronic chips P may be separated by mechanical dicing and/or by laser, by chemical etching, by physical etching, inter alia.

FIG. 3 schematically illustrates, as seen from above, an array of four ridge laser diodes 2 produced from the same die 6 and placed facing, along the Z-axis, coupling waveguides 3 of the same photonic circuit, and in particular illustrates the area in the XY-plane of the die 6 in various steps of the conventional production process.

In this example, the ridge laser diodes 2 each have a length Lf of about 800 μm along the longitudinal X-axis, for a width lf of about 50 μm along the transverse Y-axis, and are spaced apart from each other by a distance of about 200 μm along the Y-axis, here edge to edge. To obtain these dimensions, the lithography and etching steps generally involve providing a semiconductor segment 7, and therefore a die 6, with an initial so-called useful area $S_{i,u}^{elem}$ of about $1 \times 1$ mm².

However, in practice, it may be necessary to make provision for the die 6 to have a so-called necessary initial area $S_{i,n}^{elem}$ much larger than the useful initial area $s_{i,u}^{elem}$. Specifically, it is recommended to take into account an uncertainty, of the order of about ±200 μm, in the position of the die 6 with respect to the coupling waveguide(s) 3 of the corresponding elementary zone. In addition, it may also be necessary to take into account any lateral over-etching of the semiconductor segment 7 that may take place in the step of removing the growth substrate 8, which may be of the order of 300 μm from the lateral edge 7l of the semiconductor segment 7.

Thus, by way of example, to obtain a semiconductor segment 7 of a useful initial area $S_{i,u}^{elem}$ of about $1 \times 1$ mm² allowing laser diodes 2 having the desired dimensions to be obtained correctly positioned facing, along the Z-axis, respective coupling waveguides 3, it may be necessary to transfer a die 6 of a necessary initial area $S_{i,n}^{elem}$ of about $2 \times 2$ mm², i.e. of about 4 mm². Specifically, a die 6 of an area $S_{i,n}^{elem}$ of 4 mm² may result in a semiconductor segment 7 of an area $S_1^{elem}$ of about $1.4 \times 1.4 = 2.0$ mm² after removal of the growth substrate 8 and lateral over-etching of the material of the semiconductor segment 7, this area then corresponding to the useful initial area $S_{i,u}^{elem}$ of $1 \times 1$ mm² increased by 200 μm on the lateral edge 7l in the XY-plane, in order to take into account the uncertainty in position.

Thus, generally, it is as a result necessary to make provision for the necessary initial area $S_{i,n}^{elem}$ of the material of the semiconductor segment 7 to be much larger than the useful initial area $S_{i,u}^{elem}$ (of the order of 4 times larger in this example) this resulting in high fabrication costs. In addition, there is, between the necessary initial area $S_{i,n}^{elem}$ and the useful initial area $S_{i,u}^{elem}$, a loss of material of the semiconductor segment 7 of the order of 75% in this example.

To decrease fabrication costs, the process according to the invention proposes to use the same die to produce first optoelectronic components of a set E of a plurality of adjacent optoelectronic chips, this resulting in a decrease, with respect to the useful initial area, in the necessary initial area that must be added to each elementary optoelectronic-chip zone, and in a decrease in the lost volume of material of the semiconductor segment of the dies.

To this end, each die is transferred to the receiver substrate in such a way as to extend over a set E of at least two adjacent elementary zones, and preferably over a set E of four pairwise adjacent elementary zones, thus partially covering at least one coupling waveguide of each of said adjacent elementary zones. In the step of producing the first optoelectronic components, said first components produced from a given die may thus be located facing, along the Z-axis, respective coupling waveguides of said adjacent elementary zones, so that each first optoelectronic component is optically coupled to the corresponding coupling waveguide.

As detailed below, the arrays of first optoelectronic components of a set E of two adjacent elementary zones are arranged so as to be located in proximity to a separation line, i.e. a dicing line. The same goes for the coupling portions of the arrays of coupling waveguides. Generally, a separation line passes between two adjacent elementary zones, and forms a border that is common to these two adjacent elementary zones. The arrays of first optoelectronic components may furthermore be spaced apart, with respect to this separation line, by an identical distance, advantageously smaller than 600 μm, for example smaller than or equal to 300 μm. They are spaced apart from each other by a distance for example larger than 10 μm, and for example larger than or equal to 50 μm. Moreover, they may have, with respect to each other, a mirror symmetry about a plane formed by said separation line (here parallel to the X- or Y-axis) and the Z-thickness axis.

FIGS. 4A to 4D illustrate an example of a process for producing optoelectronic chips P allowing the initial area of semiconductor material required to produce the diodes 2 of each optoelectronic chip P to be limited, and therefore fabrication costs to be limited. The figures are schematic and partial views of adjacent optoelectronic chips P1, P2, for various steps of the process, along the sectional plane B-B in FIG. 5A. In this example, the dies 6 and the receiver substrate 1 are similar, in terms of material, to those of the example of FIGS. 2A to 2D. The first optoelectronic components are here laser diodes.

FIG. 4A illustrates the step of transferring dies 6 to the receiver substrate 1. Each die 6 comprises a semiconductor segment 7 based on the III-V semiconductor compound, for example based on InP forming a p-n or p-i-n junction, the free face of which is placed in contact with the front side 1a of the receiver substrate 1. It also comprises the growth substrate 8 from which the semiconductor segment 7 was produced by epitaxial growth.

Figure 5A:
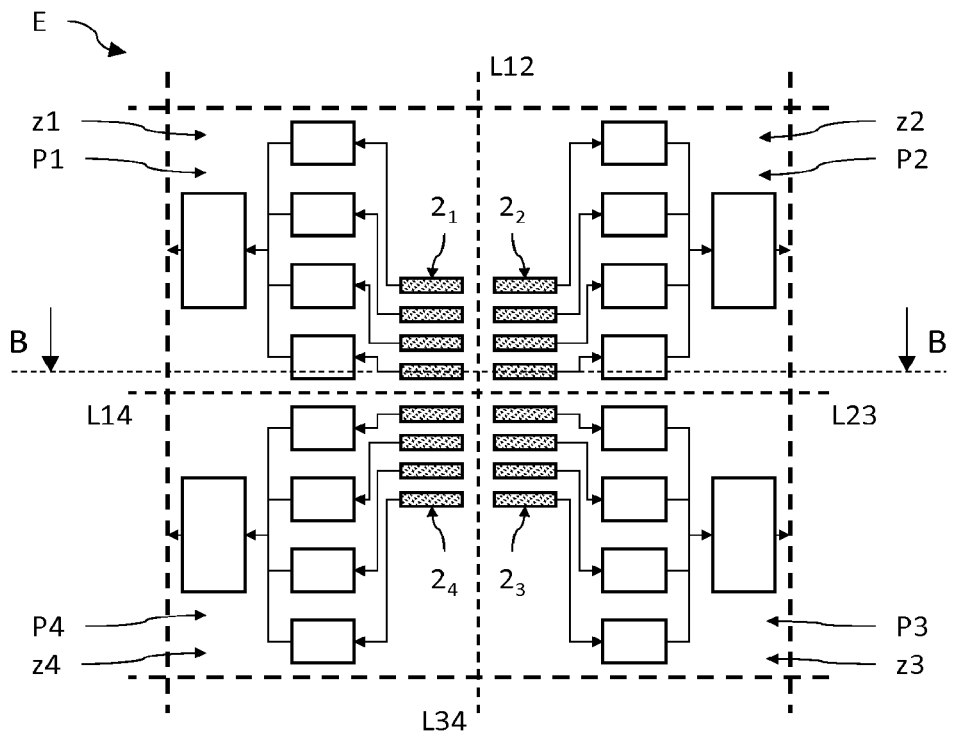
FIG. 5A illustrates partially and schematically, as seen from above, an example of four optoelectronic chips produced on a receiver substrate using the process described with reference to FIGS. 4A to 4D.

Here, each die 6 is transferred to the receiver substrate 1 so that it extends over a set E of at least two adjacent elementary zones, and in this example over a set E of four pairwise adjacent elementary zones, here z1, z2, z3, z4 in the example of FIG. 5A. It thus covers at least one coupling waveguide 3 of the photonic circuit, and here an array of four coupling waveguides 3, of each of the adjacent elementary zones z1, z2, z3, z4 of said set E. Each die 6 thus extends continuously over a portion of the four adjacent elementary zones, without interruption of the material of the transfer between the various adjacent zones.

Each die 6 has a necessary initial area $S_{i,n}^{ens}$, for example of $Li^{ens} \times Li^{ens}$ size in the case of a square cross section in the XY-plane, where $Li^{ens}$ is a dimension of the die 6 in the XY-plane. The initial area $DS_{i,n}^{ens}$ is chosen so that the respective coupling portions 3e of the coupling waveguides 3 of each adjacent elementary zone z1, z2, z3, z4 of a given set E are covered.

FIG. 4B illustrates a preferable step of removing the growth substrate 8. As above, the removal may be carried out by chemical etching, optionally preceded by mechanical thinning. The thickness of the dies 6 is then decreased so as to be substantially equal to that of the semiconductor segments 7.

In the case of lateral over-etching of the semiconductor segment 7 of the dies 6, the semiconductor segment 7 then has an area $S_1^{ens}$ in the XY-plane, for example $L1^{ens} \times L1^{ens}$ in the case of a square profile, smaller than the area $S_{i,n}^{ens}$. By way of example, the lateral border 7l of the semiconductor segment 7 may be etched over a width of about 300 μm, in other words: $L1^{ens} = Li^{ens} - 2 \times 300$ μm.

FIG. 4C illustrates a step of structuring the semiconductor segment 7 to produce at least one diode $2_1$, $2_2$, $2_3$, $2_4$ for each adjacent elementary zone z1, z2, z3, z4 of a given set E. In this example, from the same semiconductor segment 7, an array of a plurality of laser diodes 2 is produced for each of the photonic circuits of the adjacent elementary zones z1, z2, z3, z4 of a given set E.

The laser diodes 2 are here also ridge laser diodes 2 that have a length Lf along the longitudinal X-axis and a width lf along the transverse Y-axis. The laser diodes 2 are produced using conventional lithography and etching steps, so that each laser diode 2 is located facing, along the Z-axis, the coupling portion 3e of a coupling waveguide 3 of the photonic circuit of the corresponding elementary zone.

FIG. 4D illustrates the step of dicing the receiver substrate 1 along the dicing lines L, so as to obtain a plurality of separate optoelectronic chips P.

Figure 5B:
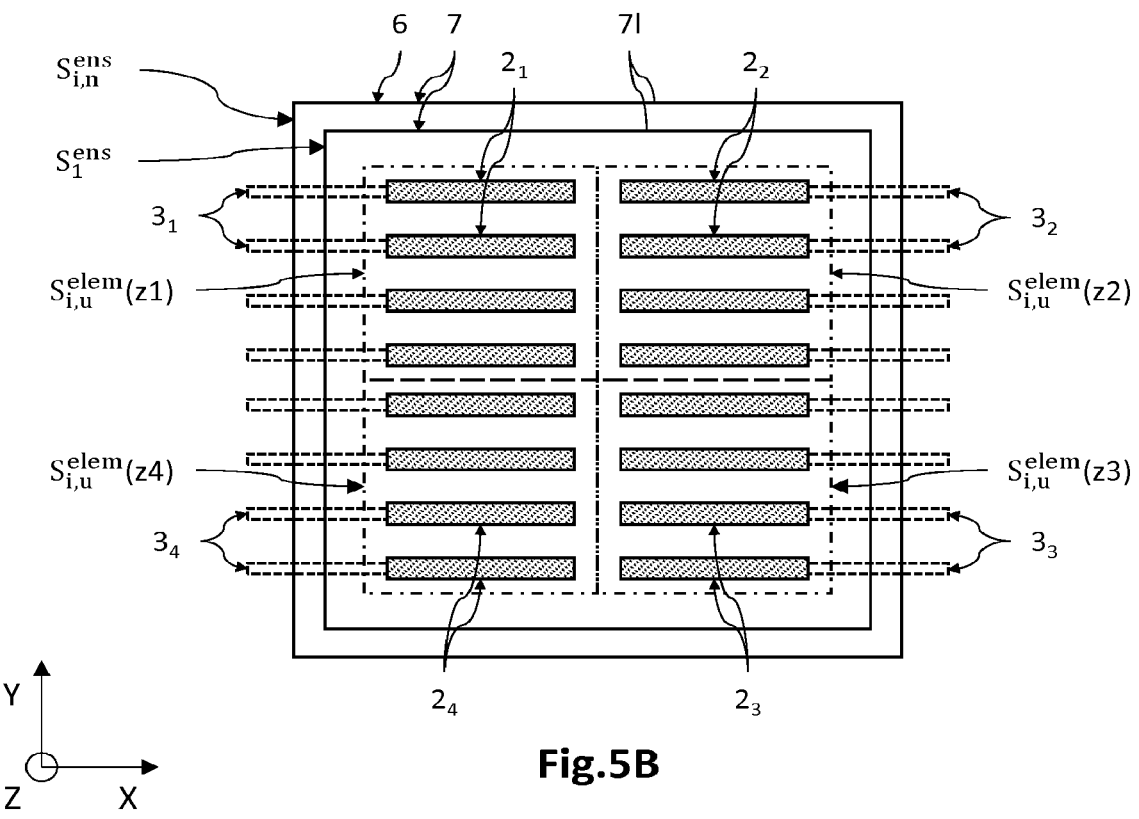
FIG. 5B partially and schematically illustrates, as seen from above, the surface of a die in the course of various steps of the process illustrated with reference to FIGS. 4A to 4D, allowing, from the same die, a plurality of laser-diode arrays to be produced in a set of four adjacent elementary zones.

As will be shown with reference to the example of FIGS. 5A and 5B, use of the same die 6 to produce the diodes 2 of a set E of adjacent elementary zones allows the necessary initial area of semiconductor material per elementary zone to be decreased, and therefore fabrication costs to be decreased.

FIG. 5A schematically illustrates a set E of pairwise adjacent optoelectronic chips P1, P2, P3, P4 produced using the production process described with reference to FIGS. 4A to 4D. FIG. 5B is a schematic view that illustrates in detail the first optoelectronic components 2, here laser diodes, of a set E of a plurality of pairwise adjacent optoelectronic chips P1, P2, P3, P4, and the various areas that the die 6 has during the production process.

Here, a set E of four pairwise adjacent optoelectronic chips P1, P2, P3, P4 are formed on the receiver substrate. They are separated from each other level with the dicing lines, or separation lines, L12, L23, L34, L14, which have been represented by dashed lines. In this example, each optoelectronic chip P1, P2, P3, P4 comprises an array of a plurality of laser diodes $2_1$, $2_2$, $2_3$, $2_4$ that are coupled to a photonic circuit comprising photonic components (such as waveguides, modulators and a wavelength multiplexer) integrated into the receiver substrate.

The photonic circuit thus comprises an array of a plurality of coupling waveguides (here represented by arrows starting from the diodes), the coupling portions of which are located facing, along the Z-axis, laser diodes 2 (FIG. 4A), so that each laser diode 2 is optically coupled to the corresponding coupling waveguide 3. Each photonic circuit here comprises optical paths each formed of a coupling waveguide optically coupled to a laser diode 2 and coupling each laser diode 2 to a modulator, and each output of a modulator to an input of the wavelength multiplexer.

In so far as the arrays of laser diodes 2 of the adjacent elementary zones z1, z2, z3, z4 were produced from the same die 6, they are located in pairwise adjacent corners of the elementary zones z1, z2, z3, z4 of a given set E. More precisely, the array of diodes 2 of an elementary zone of said set E, for example of the zone Z1, is located in a corner adjacent to the three other elementary zones z2, z3, z4 of said set E.

Moreover, at least one first diode of a first elementary zone and at least one second diode of an adjacent second elementary zone of said set E, said first and second diodes being produced from the same transfer, are located in proximity to the separation line forming a common border of said first and second adjacent elementary zones. The first and second diodes may be spaced apart from the separation line by an equal distance, the latter possibly being smaller than 600 μm, for example smaller than or equal to 300 μm, and for example equal to about 100 μm. This distance may be larger than or equal to about 10 μm, for example to 10 μm, or even to a few tens of microns, for example to 50 μm in the case of a dicing blade width of 50 μm.

In the example of FIG. 5A, the coupling portions of the coupling waveguides $3_1$ of the elementary zone z1 and the coupling portions of the coupling waveguides $3_2$ of the elementary zone z2 are preferably located in proximity to the separation line L12 forming a common border to the elementary zones z1 and z2. More precisely, the coupling portions of the coupling guides $3_1$ of the elementary zone z1 may be located at a distance from the separation line L12 smaller than the distance separating them from the separation line opposite and parallel to the line L12. Likewise, the coupling portions of the coupling guides $3_2$ of the elementary zone z2 are located at a distance from the separation line L12 smaller than the distance separating them from the separation line opposite and parallel to the line L12.

Preferably, the laser diodes $2_1$ of the elementary zone z1 are located at the same distance from the separation line L12 as the laser diodes $2_2$ of the elementary zone z2. This distance corresponds to the minimum distance between a border of the diode in question and the separation line. Thus, the diodes $2_1$ of the elementary zone z1 are spaced apart from the diodes $2_2$ of the elementary zone z2 by an edge-to-edge distance that may be smaller than 1.2 μm, for example smaller than or equal to 600 μm, and for example equal to about 200 μm. This distance is however larger than or equal to about 10 μm, for example to 10 μm, or even to a few tens of microns, and for example to 50 μm. Thus, the area of the semiconductor segment required to produce the diodes of the adjacent elementary zones of a given set E is limited.

Moreover, the coupling waveguides $3_1$ of the elementary zone z1 and the coupling waveguides $3_2$ of the elementary zone z2 are mutually arranged so that the respective coupling portions of the coupling guides $3_1$ of the elementary zone z1 are facing, in the XY-plane, the coupling portions of the coupling guides $3_2$ of the elementary zone z2, i.e. they are aligned along the longitudinal axis of the respective coupling portions of the coupling waveguides, here parallel to the X-axis. In addition, the coupling guides $3_1$ of the elementary zone z1 and the coupling guides $3_2$ of the elementary zone z2 respectively extend, from their respective coupling portions, in opposite directions to each other. In this example, the coupling guides $3_1$ of the elementary zone z1 extend in the −X direction whereas the coupling guides $3_2$ of the elementary zone z2 extend in the +X direction. Each coupling guide $3_1$ of the elementary zone z1 is positioned coaxially with a coupling guide $3_2$ of the elementary zone z2.

Preferably, the coupling waveguides $3_1$ of the elementary zone z1 and the coupling waveguides $3_2$ of the elementary zone z2 extend, from their respective coupling portions, so as to have, with respect to each other, an axial symmetry, or mirror symmetry, about the separation line L12. This allows the prior production of the photonic circuits to be simplified in so far as it is possible to use a stepper that optically covers the set E of adjacent elementary zones z1 to z4, rather than one mask per elementary zone as in the prior-art example. For each of the sets E of adjacent zones, the application of this mask is then repeated or stepped.

As regards the adjacent elementary zones z1 to z4, the coupling waveguides $3_1$ of the elementary zone z1 and the coupling waveguides $3_4$ of the elementary zone z4 are here located in proximity to the separation line L14. More precisely, the coupling guides $3_1$ of the elementary zone z1 are located at a distance from the separation line L14 smaller than the distance separating them from the separation line opposite and parallel to the line L14. Likewise, the coupling guides $3_4$ of the elementary zone z4 are located at a distance from the separation line L14 smaller than the distance separating them from the separation line opposite and parallel to the line L14.

Preferably, the diode $3_1$ of the elementary zone z1 closest to the separation line L14 is located at the same distance from the separation line L14 as the diode $3_4$ of the elementary zone z4 closest to the line L14. In the same way, these neighboring diodes $3_1$, $3_4$ may be spaced apart from each other by a distance that may be smaller than 1.2 μm, for example smaller than or equal to 600 μm, for example equal to about 200 μm. This distance may be larger than or equal to about 10 μm, for example to 10 μm or even to 50 μm. Thus the area of semiconductor segment required to produce the diodes of the adjacent zones of a given set E is limited.

Moreover, the coupling waveguides of the elementary zone z1 and the coupling waveguides of the elementary zone z4 extend, from their respective coupling portions, in directions that are parallel to each other, here in the −X direction. In this example, the respective coupling portions of the coupling guides $3_1$ and the respective coupling portions of the coupling guides $3_4$ are aligned along an axis parallel to the separation lines L12 and L34.

Preferably, the coupling waveguides $3_1$ of the elementary zone z1 and the coupling waveguides $3_4$ of the elementary zone z4 extend, from their respective coupling portions, so as to have, with respect to one another, an axial symmetry about the separation line L14. As above, this here allows the prior production of the photonic circuits to be simplified by optical application of a stepper common to each set E of adjacent elementary zones.

With reference to FIG. 5B, by way of example, to produce the arrays of laser diodes $2_1$, $2_2$, $2_3$, $2_4$ of the four adjacent elementary zones z1, z2, z3, z4 of a given set E, in which each laser diode 2 has a length Lf of about 800 μm for a width lf of about 50 μm, and is spaced apart from the neighboring laser diodes 2 by an edge-to-edge distance of about 200 μm, the die 6 has a necessary initial area $S_{i,n}^{ens}$ larger than the total useful initial area $S_{i,u}^{ens}$, the latter being substantially equal to the sum of the so-called elementary useful initial areas $S_{i,n}^{elem}$ that may here be, as in the example of FIG. 3, of the order of 1×1 mm².

Thus, to obtain a semiconductor segment 7 that has a continual, uninterrupted, total useful initial area $S_{i,u}^{ens}$, substantially equal to $4 \times S_{i,u}^{elem}$, the uncertainty in the position of the die 6 with respect to the coupling waveguides $3_1$, $3_2$, $3_3$, $3_4$ of the adjacent elementary zones z1, z2, z3, z4 of a given set E, which here is of the order of about ±200 μm, is taken into account. In addition, it is possible to take into account the possible lateral over-etching of the semiconductor segment 7 in the step of removing the growth substrate 8, which is for example of the order of 300 μm from the lateral edge 7l of the semiconductor segment 7.

Thus, in this example, to obtain a total useful initial area $S_{i,u}^{ens}$ of about 4×(1×1) mm², the die 6 may then have a total necessary initial area $S_{i,u}^{ens}$ of about 3×3=9 mm². Specifically, it is possible to obtain from a die 6 of an area $S_{i,n}^{ens}$ of 9 mm² a semiconductor segment 7 of an area $S_l^{ens}$ of about 2.4×2.4=5.8 mm² after removal of the growth substrate 8 and lateral over-etching of 300 μm of semiconductor from the lateral edge 7l of the semiconductor segment 7. This area $S_l^{ens}$ then corresponds to the total useful initial area $S_{i,u}^{ens}$ increased by 200 μm on the lateral edge 7l of the semiconductor segment 7, in the XY-plane, in order to take into account uncertainty in position.

Thus, in contrast to the prior art, to obtain an elementary useful initial area $S_{i,u}^{elem}$ of 1×1 mm² for each elementary zone, the use of the same die to produce the diodes of the adjacent elementary zones, of a total necessary initial area $S_{i,n}^{ens}$ of 3×3=9 mm², allows the necessary initial area $S_{i,n}^{elem}$, per elementary zone, to be decreased to 9/4=2.5 mm², instead of 4 mm² as in the example of FIG. 3. Thus, with respect to the example of FIG. 3, as a result the necessary initial area $S_{i,n}^{elem}$ of material of the semiconductor segment is now only, per elementary zone, of the order of 2.5 times the useful initial area $S_{i,u}^{elem}$, this representing a substantial decrease in the amount of semiconductor required per elementary zone, and therefore a decrease in fabrication costs. As a result the loss of material of the semiconductor segment, per elementary zone, corresponding to the difference between the necessary initial area $S_{i,n}^{elem}$, and the useful initial area $S_{i,u}^{elem}$, is also decreased; here in this example it is about 60% and no longer 75% as in the example of FIG. 3.

This production process also allows, for a given number of optoelectronic chips, a smaller number of pads to be used and manipulated, the number of pads being divided by 2 or by 4 with respect to the number of pads of the prior-art example. It may also allow pads of larger size to be used. The complexity and length of the process are thus decreased.

In contrast to the prior-art example, it is then possible to use, during the production of the photonic circuits of each chip, a stepper the pattern of which is optically applied to a set E of adjacent elementary zones, rather than to a single elementary zone. Thus, the pattern of the mask is optically applied to each of the sets E of adjacent zones, rather than to each of the elementary zones as in the prior art.

This allows the production process to be simplified and the length thereof to be decreased.

Whereas in the prior-art example, the pattern of the lithography mask was identical from one elementary zone to the next, it is here identical from one set E of adjacent zones to the next. Within a given set E, a first sub-pattern corresponding to a first elementary zone has a mirror symmetry with a second sub-pattern corresponding to a second elementary zone, the latter being adjacent to the first elementary zone.

Figure 6A:
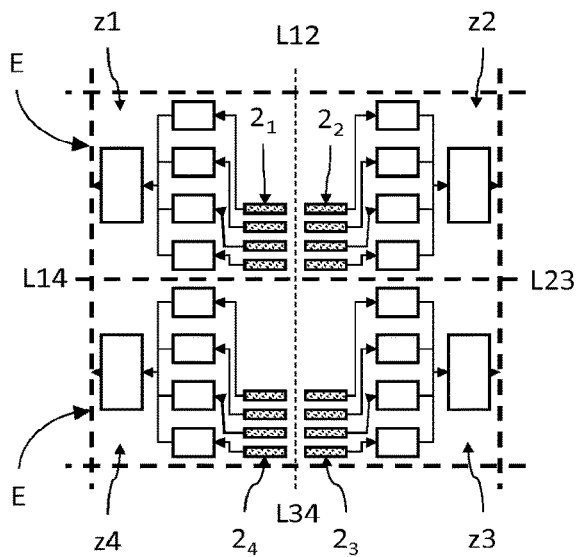
FIGS. 6A, 6B and 6C partially and schematically illustrate, as seen from above, various variants of optoelectronic chips produced on a receiver substrate, in which variants the laser-diode arrays of a set of adjacent elementary zones are obtained from the same III-V die.

FIG. 6A schematically and partially illustrates a variant of the embodiment shown in FIG. 5A, in which the diodes $2_1$, $2_2$ of the adjacent elementary zones z1 and z2 are produced from the same die, and the diodes $2_3$, $2_4$ of the adjacent elementary zones z3 and z4 are produced from another die, separate from the preceding one. The respective coupling portions of the coupling waveguides of the zone z1 have an axial symmetry about the line L12 with respect to the coupling waveguides of the zone z2. The same goes for the coupling guides of the zone z4 with respect to those of the zone z3 about the line L34.

Figure 6B:
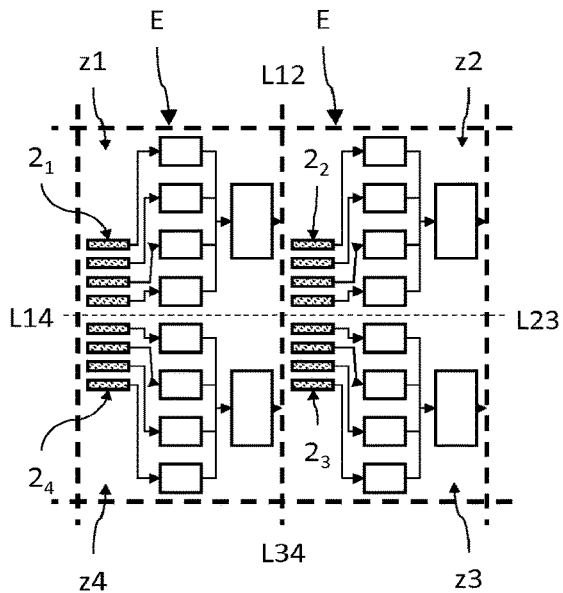

FIG. 6B schematically and partially illustrates a variant of the variant shown in FIG. 6A, in which the diodes $2_1$, $2_4$ of the adjacent elementary zones z1 and z4 are produced from the same die, and the diodes $2_2$, $2_3$ of the adjacent elementary zones z2 and z3 are produced from another die, separate from the preceding one. The respective coupling portions of the coupling waveguides of the zone z1 have an axial symmetry about the line L14 with respect to the coupling waveguides of the zone z4. The same goes for the coupling guides of the zone z2 with respect to those of the zone z3 about the line L23.

Figure 6C:
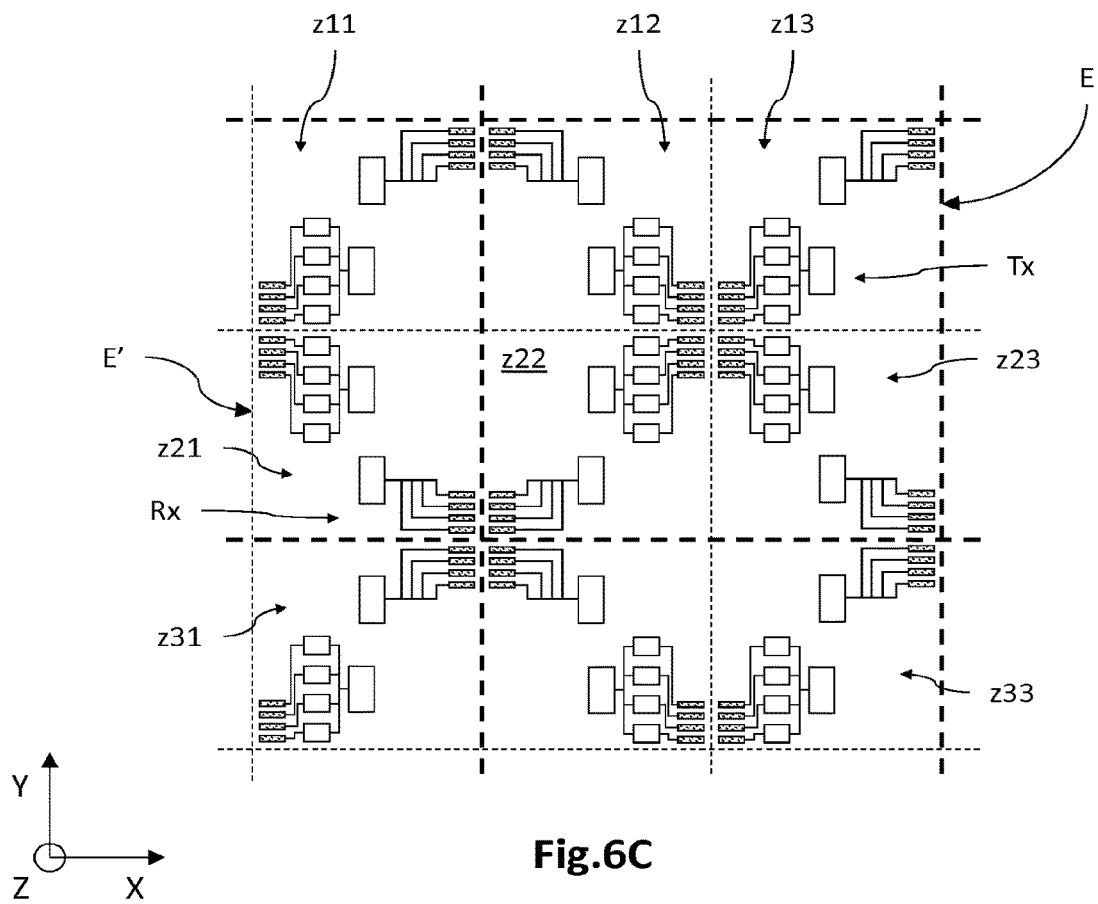

FIG. 6C schematically and partially illustrates another variant in which a given elementary zone comprises a laser-diode-based transmitter Tx and a photodiode-based receiver Rx. In this example, the transmitter Tx is identical to that described above and the receiver Rx comprises an array of photodiodes that are optically coupled to a waveguide, itself coupled to a demultiplexer, the waveguides and the demultiplexer being integrated into the interior of the receiver substrate. The transmitters Tx and receivers Rx may comprise other photonic components, such as couplers to optical fibers.

The process for producing optoelectronic chips on the wafer-scale then comprises a step of transferring first pads, or dies, in which each first die, based on a first semiconductor compound, extends over a set E of a plurality of adjacent elementary zones. In this example, the same first die allows the laser diodes of a set E of adjacent elementary zones z12, z13, z22, z23 to be produced.

The process also comprises a step of transferring second pads, or dies, of different nature, this step preferably being carried out simultaneously with the step of transferring the first pads. The second pads are based on a second semiconductor compound that may be identical or different from the first semiconductor compound, and are transferred to a set E' of a plurality of adjacent elementary zones, this set E' being different from the set E but possibly comprising elementary zones common to the latter. In this example, the same second die allows the photodiodes of a set E' of adjacent elementary zones z21, z22, z31, z32 to be produced. It is therefore distinct from the set E but comprises, in common with the latter, the elementary zone z22.

Particular embodiments have just been described. Various variants and modifications will appear obvious to anyone skilled in the art.

Thus, each optoelectronic chip may comprise an electroabsorption modulator based on a third semiconductor compound different or similar to the semiconductor compound of the laser diodes and/or photodiodes, and obtained from a third pad or die. As mentioned above, the third dies may be transferred to another set E" of a plurality of adjacent elementary zones, this set E" being distinct from the sets E and E' though possibly comprising elementary zones in common with the latter.

Moreover, each first optoelectronic component, such as a laser diode, a photodiode or an electroabsorption modulator, may furthermore be electrically connected to an integrated circuit present in the corresponding elementary zone. The integrated circuit thus comprises electrically conductive tracks located in the interior of the receiver substrate, and a thin electrically conductive layer located on the surface of the receiver substrate, on which the first optoelectronic component rests.

The invention claimed is:

1. A process for producing, on a wafer-scale, a plurality of optoelectronic chips, comprising the following steps:
   providing a receiver substrate comprising a plurality of elementary zones, each of which being configured to contain one optoelectronic chip, and each of which comprising at least one coupling waveguide integrated into the receiver substrate and configured to be optically coupled to a first optoelectronic component;
   transferring a plurality of pads to the plurality of elementary zones such that the pads partially cover the at least one coupling waveguide; and
   producing the first optoelectronic component from the pads such that each first optoelectronic component is facing the at least one coupling waveguide of a corresponding elementary zone,
   wherein, following the transferring step, each pad of the plurality of pads extends over a set of at least two adjacent elementary zones, so as to partially cover the at least one coupling waveguide of each of said adjacent elementary zones,
   wherein at least one first optoelectronic component of a first elementary zone and at least one second optoelectronic component of a second elementary zone adjacent to the first elementary zone and belonging to the set, are respectively spaced apart by an equal distance from a separation line forming a common border to the first and second adjacent elementary zones, and
   wherein the first and second optoelectronic components are produced from the same pad.

2. The process according to claim 1, wherein, in the step of producing the first optoelectronic component, said each first optoelectronic component produced is disposed facing one of the at least one coupling waveguide of said adjacent elementary zones of said set.

3. The process according to claim 1, wherein the distance is less than 600 µm.

4. The process according to claim 1, wherein the first optoelectronic component and the second optoelectronic component are spaced apart from each other by a distance less than 1.2 µm.

5. The process according to claim 1, wherein a first optoelectronic component is disposed facing a coupling portion of a first coupling waveguide of a first elementary zone of a set, and a second optoelectronic component is disposed facing a coupling portion of a second coupling waveguide of a second elementary zone adjacent to the first elementary zone and belonging to the set, the first and second coupling waveguides extending in parallel from respective coupling portions thereof.

6. The process according to claim 5, wherein the first and second coupling waveguides extend, from the respective coupling portions, in opposite directions to each other.

7. The process according to claim 5, wherein the first and second coupling waveguides extend, from the respective coupling portions, in directions that are parallel to each other.

8. The process according to claim 5, wherein the first coupling waveguide and the second coupling waveguide extend, from the respective coupling portions, so as to have, with respect to each other, an axial symmetry about a separation line forming a common border to the first and second elementary zones.

9. The process according to claim 1, wherein said each pad of the plurality of pads extends over a set of four pairwise adjacent elementary zones.

10. The process according to claim 1, wherein said each pad of the plurality of pads comprises a semiconductor segment based on a semiconductor compound, and a growth substrate from which the semiconductor segment is produced by epitaxy.

11. The process according to claim 10, further comprising a step of removing the growth substrate, the growth substrate being made from an alloy based on said semiconductor compound.

12. The process according to claim 1, wherein said each pad of the plurality of pads comprises a semiconductor segment based on a III-V semiconductor compound.

13. The process according to claim 1, wherein the first optoelectronic component is a laser source, a photodiode, or an electro-optical modulator.

14. The process according to claim 1,
wherein each elementary zone of the set of at least two adjacent elementary zones comprises an array of a plurality of coupling waveguides, and
wherein an array of a plurality of first optoelectronic components is produced for each of the elementary zones of said set, such that first optoelectronic components of the array are respectively facing corresponding coupling waveguides.

15. The process according to claim 1, further comprising:
a step of transferring a plurality of first pads, from which a plurality of laser diodes are produced; and
a step of transferring a plurality of second pads, from which a plurality of photodiodes or a plurality of electro-optical modulators are produced.

* * * * *